(12) United States Patent
Otts (10) Patent No.: US 8,290,741 B2
(45) Date of Patent: Oct. 16, 2012

(54) FUSING MULTI-SENSOR DATA SETS ACCORDING TO RELATIVE GEOMETRICAL RELATIONSHIPS

(75) Inventor: Daniel W. Otts, Allen, TX (US)

(73) Assignee: Raytheon Company, Waltham, MA (US)

( * ) Notice: Subject to any disclaimer, the term of this patent is extended or adjusted under 35 U.S.C. 154(b) by 443 days.

(21) Appl. No.: 12/686,467

(22) Filed: Jan. 13, 2010

(65) Prior Publication Data

US 2011/0172962 A1 Jul. 14, 2011

(51) Int. Cl.
*G06F 19/00* (2011.01)
(52) U.S. Cl. ...................................... 702/181
(58) Field of Classification Search .................. 702/116, 702/117, 118, 181, 182–185, 188
See application file for complete search history.

(56) References Cited

U.S. PATENT DOCUMENTS

| | | |
|---|---|---|
| 5,699,447 A | 12/1997 | Alumot et al. |
| 5,982,921 A | 11/1999 | Alumot et al. |
| 6,064,759 A | 5/2000 | Buckley et al. |
| 6,178,257 B1 | 1/2001 | Alumot et al. |
| 6,330,523 B1 | 12/2001 | Kacyra et al. |
| 6,501,414 B2 | 12/2002 | Arndt et al. |
| 6,952,491 B2 | 10/2005 | Alumot et al. |
| 7,053,820 B2 | 5/2006 | Goodman et al. |
| 7,062,417 B2 | 6/2006 | Kruger et al. |
| 7,151,976 B2 | 12/2006 | Lin |
| 7,307,575 B2 | 12/2007 | Zemany |
| 7,499,583 B2 | 3/2009 | Alumot et al. |
| 7,526,405 B2 | 4/2009 | Miller et al. |
| 7,796,807 B2 | 9/2010 | Alumot et al. |
| 2007/0241738 A1 | 10/2007 | Baranauskas et al. |
| 2009/0033539 A1 | 2/2009 | Zemany |
| 2009/0243916 A1 | 10/2009 | Beeri et al. |
| 2009/0289830 A1 | 11/2009 | Pergande et al. |
| 2009/0295618 A1 | 12/2009 | Beeri et al. |
| 2010/0134285 A1* | 6/2010 | Holmquist ................ 340/541 |

FOREIGN PATENT DOCUMENTS

EP 1 777 550 A1 4/2007

OTHER PUBLICATIONS

Kruskal, J.B., "*Multidimensional Scaling by Optimizing Goodness of Fit to a Nonmetric Hypothesis*", Psychometrika, vol. 29, No. 1, XP008130844, 27 pages, Mar. 1, 1964.
Lee, Sang-Chul, et al., "*Multisensor Raster and Vector Data Fusion Based on Uncertainty Modeling*", 2004 International Conference on Image Processing (ICIP), IEEE, pp. 3355-3358, Oct. 2004.

(Continued)

*Primary Examiner* — Edward Raymond
(74) *Attorney, Agent, or Firm* — Cantor Colburn LLP (57) ABSTRACT

In particular embodiments, fusing multi-sensor data sets includes receiving a first sensor data set and a second sensor data set generated in response to sensing a structure. The sensor data sets describe structural features of the structure. First delta vector sets are generated for the first sensor data set, and second delta vector sets are generated for the second sensor data set. Each delta vector set comprises delta vectors indicating relative geometrical relationships between a structural feature and other structural features. Association scores are determined for delta pairs comprising a first delta vector set and a second delta vector set. Same feature delta pairs are identified according to the association scores. A same feature delta vector set comprises a delta pair corresponding to the same structural feature.

20 Claims, 5 Drawing Sheets

OTHER PUBLICATIONS

PCT, Notification of Transmittal of the International Search Report and the Written Opinion of the International Searching Authority, or the Declaration, International Application No. PCT/US2010/053095, 14 pages, Mar. 9, 2011.

Wenxia, Shi, et al. "Investigating the Performance of Corridor and Door Detection Algorithms in Different Environments", Information and Automation, 2006, ICIA 2006. International Conference on, IEEE, Dec. 1, 2006 pp. 206-211.

Holland, John, "Designing Autonomous Mobile Robots: Inside the Mind of an Intelligent Machine", Dec. 29, 2003, Newness, pp. 1-352.

Newman, P., et al., "Outdoor SLAM using visual appearance and laser ranging" Robotics and Automation, 2006, ICRA 2006 Proceedings 2006 IEEE International Conference at Orlando, Fl. May 15-19, 2006 IEEE, May 15, 2006, pp. 1180-1187.

Siagian, C., et al., "Biologically Inspired Mobile Robot Vision Localization", IEEE Service Center, vol. 25, No. 4, Aug. 1, 2009, pp. 861-873.

Stilla, U. et al., "Potential and limits of InSAR data for building reconstruction in built-up areas" ISPRS Journal of Photogrammetry and Remote Sensing, vol. 58, No. 1-2, Jun. 1, 2003, pp. 113-123.

Nerino, R., "Automatic registration of point-based surfaces", WSEAS Transactions on Computers World Scientific and Engineering Academy and Society, vol. 5, No. 12, Dec. 1, 2006 pp. 2984-2991.

Notification of Transmittal of the International Search Report and the Written Opinion of the International Search Authority, or the Declaration, PCT/US2011/020064 dated Mar. 16, 2011, 13 pages.

Jean-Philippe Thirion, "*New Feature Points based on Geometric Invariants for 3D Image Registration*", International Journal of Computer Vision, vol. 18, No. 2, pp. 121-137, May 1, 1996.

Roberto Nerino, "*Invariant features for automatic coarse registration of point-based surfaces*", Proc. of the 6th WSEAS Int. Conf. on Signal Processing, Computational Geometry & Artificial Vision, Elounda, Greece, XP-002634722, pp. 10-15, Aug. 21-23, 2006.

Marinella Cadoni, et al., "*3D Face Recognition Using Joint Differential Invariants*", Advances in Biometrics, Springer Berlin Heidelberg, Berlin, Heidelberg, XP019117937, pp. 279-288, Jun. 2, 2009.

PCT Notification of Transmittal of the International Search Report and the Written Opinion of the International Searching Authority, or the Declaration, International Application No. PCT/US2011/020726, 13 pages, May 10, 2011.

Leavers, V. F., ed., "*Shape Detection in Computer Vision Using the Hough Transform*", Towards a Representation of Shape, XP007914240, ISBN: 978-3-540-19723-2, pp. 88-107, Jan. 1, 1992.

Tat Soon Yeo, et al., "*A New Subaperture Approach to High Squint SAR Processing*", IEEE Transactions on Geoscience and Remote Sensing, vol. 39, No. 5, XP011021759A, ISSN: 0196-2892, pp. 954-968, May 1, 2001.

Bin Luo, et al., "*Graph Spectral Approach for Learning View Structure*", 16th International Conference on Pattern Recognition (ICPR '02), vol. 3, XP010613741A, ISBN: 978-0-7695-1695-0, pp. 785-788, Aug. 11, 2002.

Ma Yi et al., "*An invitation to 3-D Vision, Representation of a Three-Dimensional Moving Scene, Quaternions and Euler Angles for Rotations*", Springer Verlag, Berlin, XP007914241, ISBN: 978-0-387-00893-6, pp. 390-403, Jan. 1, 2004.

Zhiguang Zhong, et al., "*Pose Estimation and Structure Recovery from Point Pairs*", Proceedings of the 2005 IEEE International Conference on Robotics and Automation, Barcelona, Spain, XP010872265A, ISBN: 978-0-7803-8914-4, pp. 442-447, Apr. 18, 2005.

Zhiguang, Zhong, et al., "*Effective pose estimation from point pairs*", Image and Vision Computing, Elsevier, vol. 23, No. 7, XP004921786, ISSN: 0262-8856, pp. 651-660, Jul. 1, 2005.

Roberto Nerino, "*Automatic registration of point-based surfaces*", WSEAS Transactions on Computers, Issue 12, vol. 5, ISSN: 1109-2750, XP8125025A, pp. 2984-2991, Dec. 1, 2006.

Dr. Christophe Gouinaud, "*SAR Image Fusion in Multi Sensor Context for Small Urban Area Detection*", IGARSS, IEEE, XP031422669, ISBN: 978-'-4244-2807-6, pp. III-988 thru III-991, Jul. 7, 2008.

PCT, Notification of Transmittal of the International Search Report and the Written Opinion of the International Searching Authority, or the Declaration, International Application No. PCT/US2010/031824, 16 pages, Aug. 12, 2010.

Patent Application entitled "*Fusing Multi-Sensor Data to Provide Estimates of Structures*," U.S. Appl. No. 12/427,474, 27 pages specification, claims, and abstract, 8 pages of drawings, inventors Benjamin M. Howe et al., Apr. 21, 2009.

Patent Application entitled "*Fusing Structures From Multi-Sensor Data*," 26 pages specification, claims, and abstract, 4 pages of drawings, inventor Daniel W. Otts, Jan. 13, 2010.

USPTO Office Action, U.S. Appl. No. 12/427,474 to Benjamin H. Howe; 11 pages, dated Mar. 28, 2011.

U.S. Appl. No. 12/683,924 entitled "*Designating Corridors to Provide Estimates of Structures*", by Daniel W. Otts, 24 pages, filed Jan. 7, 2010.

\* cited by examiner

FUSING MULTI-SENSOR DATA SETS ACCORDING TO RELATIVE GEOMETRICAL RELATIONSHIPS

TECHNICAL FIELD

This invention relates generally to the field of sensor data analysis and more specifically to fusing multi-sensor data sets according to relative geometrical relationships.

BACKGROUND

Enforcement, security, and military forces may perform operations in structures such as buildings. Multiple sensors may be used to determine the layout of the structure. In certain situations, however, fusing the data from multiple sensors may be difficult.

SUMMARY OF THE DISCLOSURE

In accordance with the present invention, disadvantages and problems associated with previous techniques for fusing multi-sensor data sets may be reduced or eliminated.

In particular embodiments, fusing multi-sensor data sets includes receiving a first sensor data set and a second sensor data set generated in response to sensing a structure. The sensor data sets describe structural features of the structure. First delta vector sets are generated for the first sensor data set, and second delta vector sets are generated for the second sensor data set. Each delta vector set comprises delta vectors indicating relative geometrical relationships between a structural feature and other structural features. Association scores are determined for delta pairs comprising a first delta vector set and a second delta vector set. Same feature delta pairs are identified according to the association scores. A same feature delta vector set comprises a delta pair corresponding to the same structural feature.

Certain embodiments of the invention may provide one or more technical advantages. A technical advantage of one embodiment may be that relative geometrical relationships among features of one sensor data set may be compared to relative geometrical relationships among features of another sensor data set to fuse the data sets. Using relative geometrical relationships instead of absolute geometrical relationships eliminates the need to determine absolute geometrical relationships of the features with respect to a coordinate system common to both sensor data sets.

Another technical advantage of one embodiment may be that the relationships may be compared using association scores. An association score indicates the probability that features of different sensor data sets represent the same physical feature. Features with an association score that indicates a high probability may be candidates for fusing.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
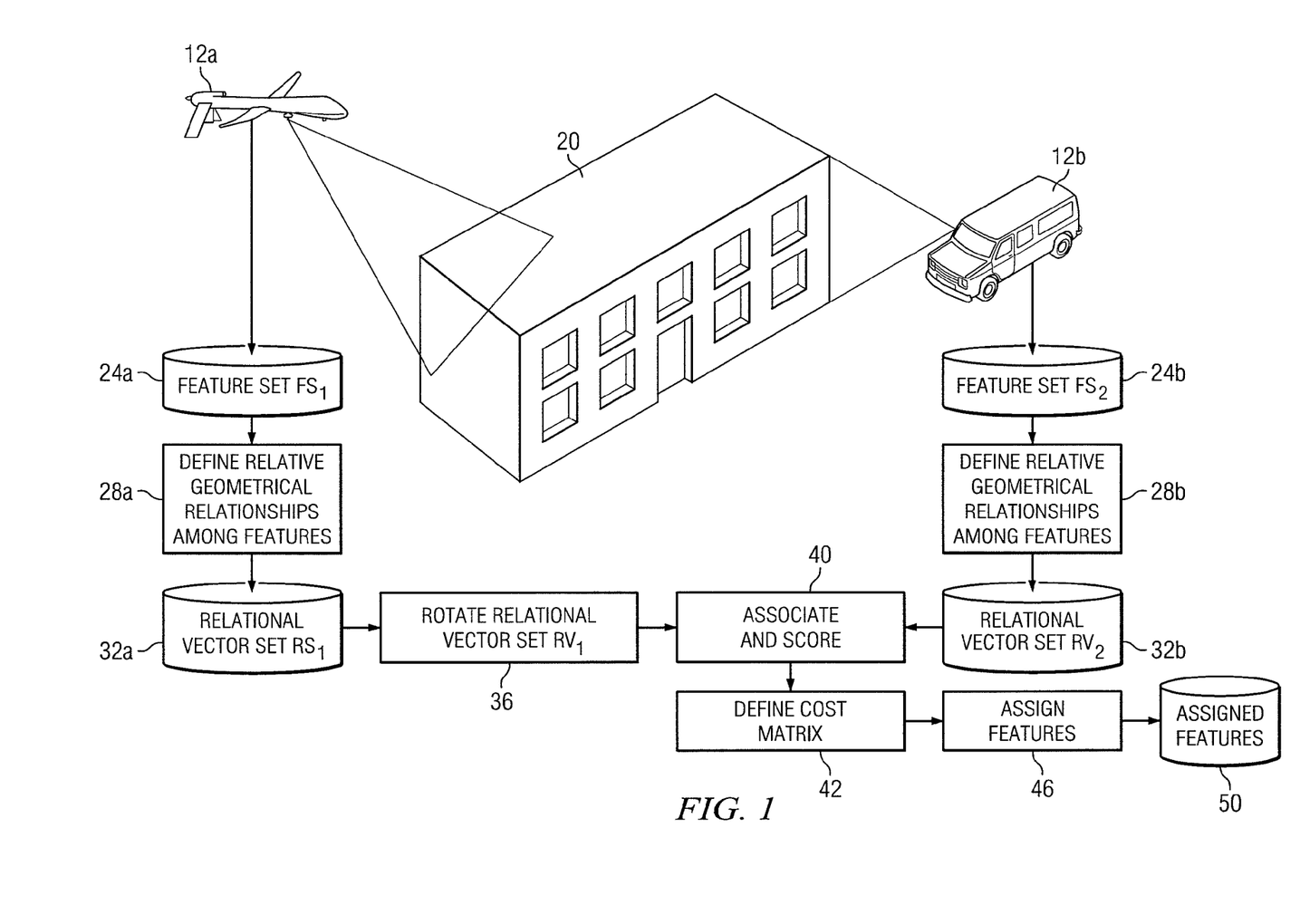
FIG. 1 illustrates an example of a method for fusing multi-sensor data sets according to relative geometrical relationships.

FIG. 1 illustrates an example of a method for fusing multi-sensor data sets according to relative geometrical relationships. In particular embodiments, relative geometrical relationships among features of one sensor data set may be compared to relative geometrical relationships among features of another sensor data set to fuse the data sets. The relationships may be compared using association scores that indicate the probability that features of different sensor data sets represent the same physical feature. Features with an association score that indicates a high probability may be candidates for fusing.

In the example, sensor systems 12 (12a, b) include sensors that detect one or more structures 20 and generate sensor data sets that include feature sets that describe features of structures 20. Sensor systems 12 may detect structures 20 at different angles. For example, sensor system 12a may be directly above structures 20, and sensor system 12b may be to the side of structures 20. Sensor systems 12 may also detect structures 20 at different distances. For example, sensor system 12a may be close to structures 20, and sensor system 12b may be far away from structures 20.

The sensor data sets may be fused to generate a single image of structures 20. In the example, steps with an "a" indicate steps that apply to sensor system 12a, and steps with a "b" indicate steps that apply to sensor system 12b. In particular embodiments, features sets $FS_1$ and $FS_2$ from sensor systems 12a and 12b, respectively, are stored at step 24 (24a, b). Relative geometric relationships are defined among the features of the sensor data sets at step 28 (28a, b). The relative geometrical relationships may be described by relational vector sets $RV_1$ and $RV_2$. Relational vector sets $RV_1$ and $RV_2$ are stored at step 32 (32a, b). A relational vector set, such as relational vector set $RV_1$, is rotated relative to the other relational vector set at step 36.

Features of different sensor data sets are associated with each other and scored at step 40. A score may indicate the probability that features of different data sets correspond to (such as, represent) the same physical feature. In certain embodiments, a higher score may indicate a higher probability, but in other embodiments, a lower score may indicate a higher probability. For example, a score may be given as a cost, where lower cost indicates a higher probability.

A cost matrix is defined at step 42. The cost matrix may include the scores given as costs. Features are assigned at step 46. Features of different data sets that correspond to the same physical feature according to the costs may be assigned to each other. The assigned features may be registered in a common coordinate system. The assigned features are stored at step 50.

Figure 2:
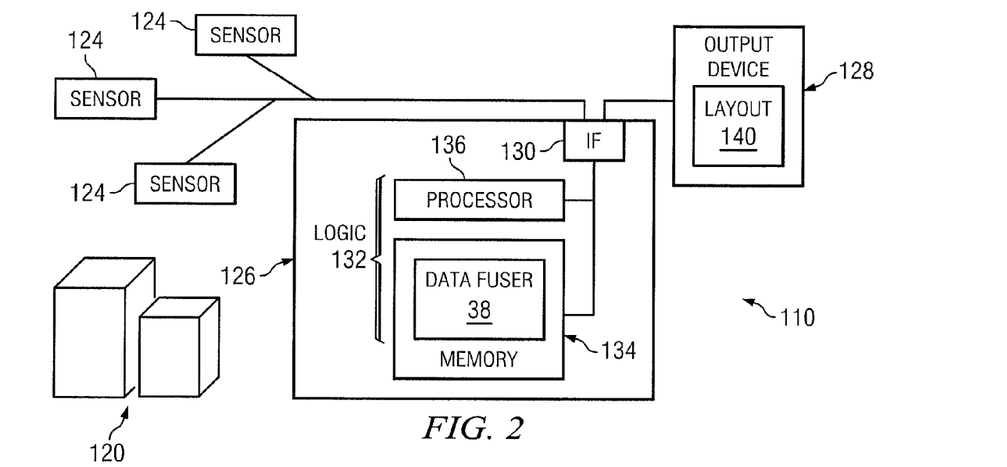
FIG. 2 illustrates one embodiment of a system configured to fuse multi-sensor data sets according to relative geometrical relationships.

FIG. 2 illustrates one embodiment of a system 110 configured to fuse multi-sensor data sets according to relative geometrical relationships. In the illustrated embodiment, system 110 includes sensors 124, a computing system 126, and an output device 128. Computing system 126 includes an interface (IF) 130, logic 132, and memory 134. Logic 132 includes a processor 136 and applications such as a data fuser 138. Output device 128 displays a layout 140.

In the illustrated embodiment, structures 120 may be one or more natural and/or manmade physical objects. Examples of structures 120 include buildings such as military, corporate, residential, academic, or medical buildings. In certain embodiments, a structure 120 may have internal features that are not visible outside of structure 120. For example, a building may have rooms bordered by walls such that the rooms are not visible outside of the building. The layout of a structure 20, such as the floor plan of a building, may describe at least some of these internal features.

Structures 120 may have structural features that are physical features of the geometry of the structure. For example, the structural features of a building may include walls of a room and corners of a room where two walls meet. Structural features may be used to generate a layout 140 of the structures 120. The layout of a room may be provided in two dimensions (2D) or three dimensions (3D). In certain embodiments, two-dimensional layouts may be extended to three dimensions by providing two-dimensional slices that describe the layout of an x-y plane, where the x-y plane may be parallel to the ground. The two-dimensional slices may be provided in the z direction orthogonal to the ground.

Sensors 124 may generate sensor data in response to sensing one or more structures 120. Sensor 124 may be any suitable sensing device. Examples of sensor 124 include radar sensors, video cameras, camcorders, closed-circuit television cameras, digital cameras, surveillance cameras, infrared cameras, x-ray cameras, and/or satellite cameras. In certain embodiments, more than one sensor 124 may send data to computing system 126.

Sensor data from a particular sensor 124 may be placed in a sensor data set. The sensor data may describe the structural features of structures 120. Sensor data may indicate a location and/or an orientation of each feature of the each sensor data set. The data may provide a confidence level of the location and/or an orientation.

Computing system 126 receives sensor data from one or more sensors 124 and fuses the sensor data to generate a layout 140 of structures 120. Interface 130 receives input, sends output, processes the input and/or output, and/or performs other suitable operation. Interface 130 may comprise hardware and/or software.

Logic 132 performs the operations of the component, for example, executes instructions to generate output from input. In certain embodiments, data fuser 138 fuses multi-sensor data sets. In the embodiments, data fuser 138 receives sensor data sets. The sensor data sets include a first sensor data set and a second sensor data set that describe structural features of structures 120. Data fuser 138 generates a first relational set for the first sensor data set and a second relational set for the second sensor data set. The first relational set includes a plurality of first delta vector sets, and the second relational set includes a plurality of second delta vector sets. A delta vector set comprises delta vectors that describe one or more relative geometrical relationships between a structural feature of a sensor data set and one or more other structural features of the sensor data set. For example, a delta vector may describe the angle and distance between the structural feature and the other structural feature.

Data fuser 138 determines association scores for delta pairs, where a delta pair comprises a first delta vector set and a second delta vector set. Data fuser 138 identifies same feature delta pairs according to the association scores, where a same feature delta vector set comprises a delta pair corresponding to the same physical feature. Data fuser 138 assigns features of the first sensor data set to features of the second sensor data set according to the same feature delta pairs. Data fuser 138 may use this information to generate layout 140 of structures 120. This method is described in more detail with respect to FIG. 3.

Logic 132 may include hardware, software, and/or other logic. Logic 132 may be encoded in one or more tangible media and may perform operations when executed by a computer. Certain logic 132, such as processor 136, may manage the operation of a component. Examples of a processor 136 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 134 stores information an applications such as layout generator 138. Memory 134 may comprise one or more tangible, computer-readable, and/or computer-executable storage medium. Examples of memory 134 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Output device 128 outputs layout 140 generated by computing system 126. Output device may provide layout 140 in any suitable manner, for example, as a visual display, a printed hard copy, or an audio file. Examples of output device 128 includes a computer display, a printer, or a speaker.

Figure 3:
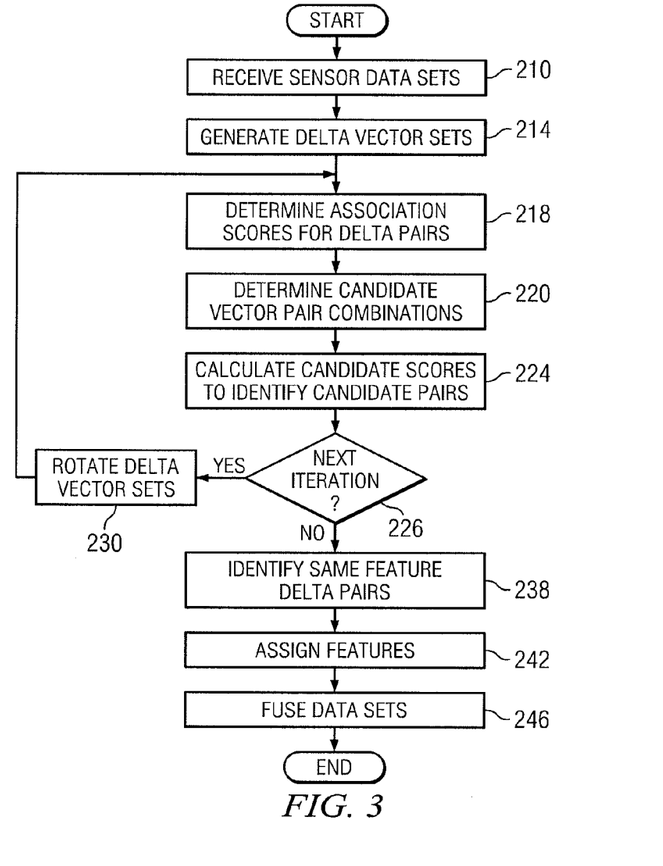
FIG. 3 illustrates an example of a method for fusing multi-sensor data.

FIG. 3 illustrates an example of a method for fusing multi-sensor data that may be performed by system 110 of FIG. 2. Sensor data sets are received at step 210. The sensor data sets may include a first sensor data set $SD_1$ and a second sensor data set $SD_2$ generated in response to sensing one or more structures 120. The sensor data sets $SD_1$ and $SD_2$ include feature sets $FS_1$ and $FS_2$, respectively, that describe structural features of structures 120. A feature set may describe the locations of features with respect to a coordinate system. Different feature sets may use different coordinate systems.

In certain embodiments, sparse data sets may be used. A sparse data set may be refer to a set that does not include all features, but includes a sufficient number of features that represent common features and that may be used to determine assignment vectors. Sparse sets may be formed from the sensor data sets by removing closely spaced features. Closely spaced features, which may be features located within a distance threshold, may be considered redundant and removed from the calculations. In certain embodiments, the distance threshold may be a function of the location error of the sensor. For example, a sensor A provides feature location estimates with a 10 centimeter (cm) mean location error relative to the true feature location, and sensor B provides feature location estimates with a 50 cm mean location error relative to the true feature location. In the example, sensor A and sensor B provide an estimated location for feature 1. For the feature set from sensor A, features located within some function of the 10 cm error around feature 1 may be regarded as redundant and removed from the calculations. For the feature set from sensor B, features located within some function of the 50 cm error around feature 1 may be regarded as redundant and removed from the calculations.

Relational vector sets that include delta vector sets are generated at step 214. Relational vector set $RV_1$ that includes first delta vector sets $DV_1$ may be generated for the first sensor data set, and relational vector set $RV_2$ that includes second delta vector sets $DV_2$ may be generated for the second sensor data set. A delta vector set for a particular feature of a sensor data set comprises delta vectors that describe one or more relative geometrical relationships between that feature and one or more other features of the sensor data set. For example, a delta vector for a feature may describe the angle and/or distance between the feature and the other feature. Examples of delta vector sets are described with reference to FIG. 4.

Figure 4:
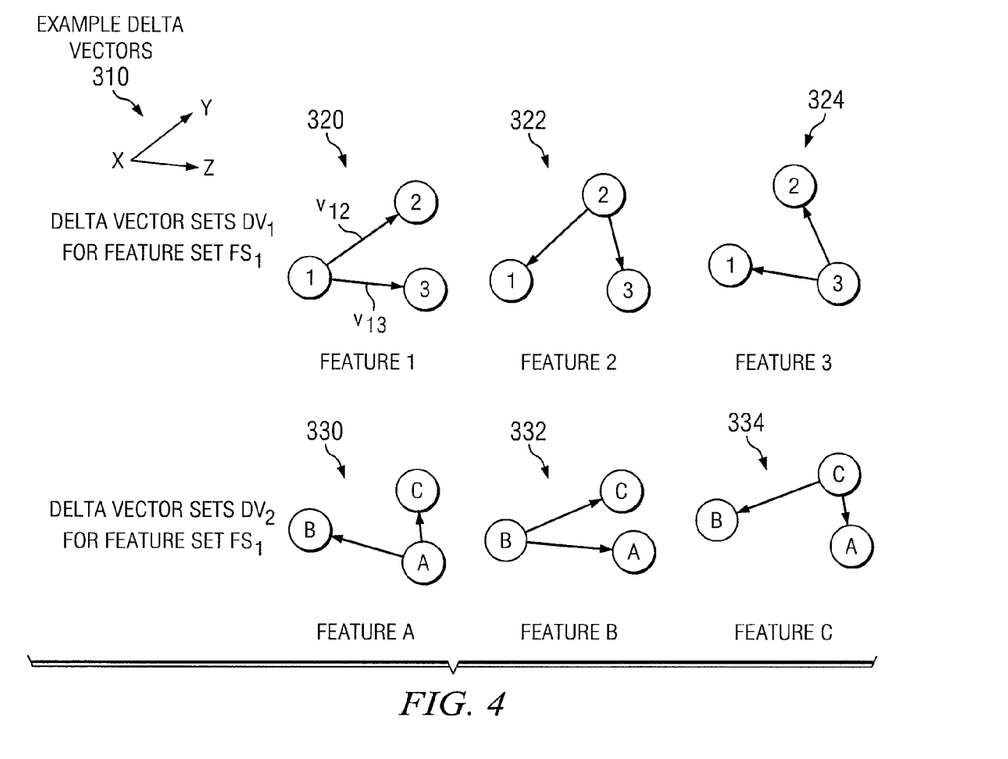
FIG. 4 illustrates examples of delta vector sets.

FIG. 4 illustrates examples of delta vector sets that may be used to describe relative geometrical relationships among features of a feature set. An example delta vector 310 for feature X describes the relative geometrical relationship of feature X with respect to other features Y and Z. In the example, the origin of delta vector 310 represents feature X, and the tips of the delta vectors point to features Y and Z. Delta vector $v_{xy}$ represents relative geometrical relationships (such as angle and/or distance) between features X and Y, and delta vector $v_{xz}$ represents relative geometrical relationships (such as angle and/or distance) between features X and Z.

In the example, feature set $FS_1$ includes features 1, 2, and 3, and feature set $FS_2$ includes features A, B, and C. In the example, delta vector sets 320, 322, and 324 represent relative geometrical relationships for features 1, 2, and 3, respectively. Delta vector sets 330, 332, and 334 represent relative geometrical relationships for features A, B, and C, respectively.

Referring back to FIG. 3, association scores are determined for delta pairs at step 218. A delta pair comprises a first delta vector set $DV_1$ from relational vector set $RV_1$ and a second delta vector set $DV_2$ from relational vector set $RV_2$. A delta pair may be represented by X-U, where X represents a delta vector set $DV_1$ and U represents a delta vector set $DV_2$. For example, delta pairs for feature sets $FS_1$ and $FS_2$ include 1-A, 1-B, 1-C, 2-A, 2-B, 2-C, 3-A, 3-B, and 3-C.

An association score may be determined for each delta pair. An association score may represent the likelihood that the features of the pairs of delta vector sets represent the same physical feature. The association score may be determined in any suitable manner. An example of a method is described in more detail with reference to FIG. 5.

Figure 5:
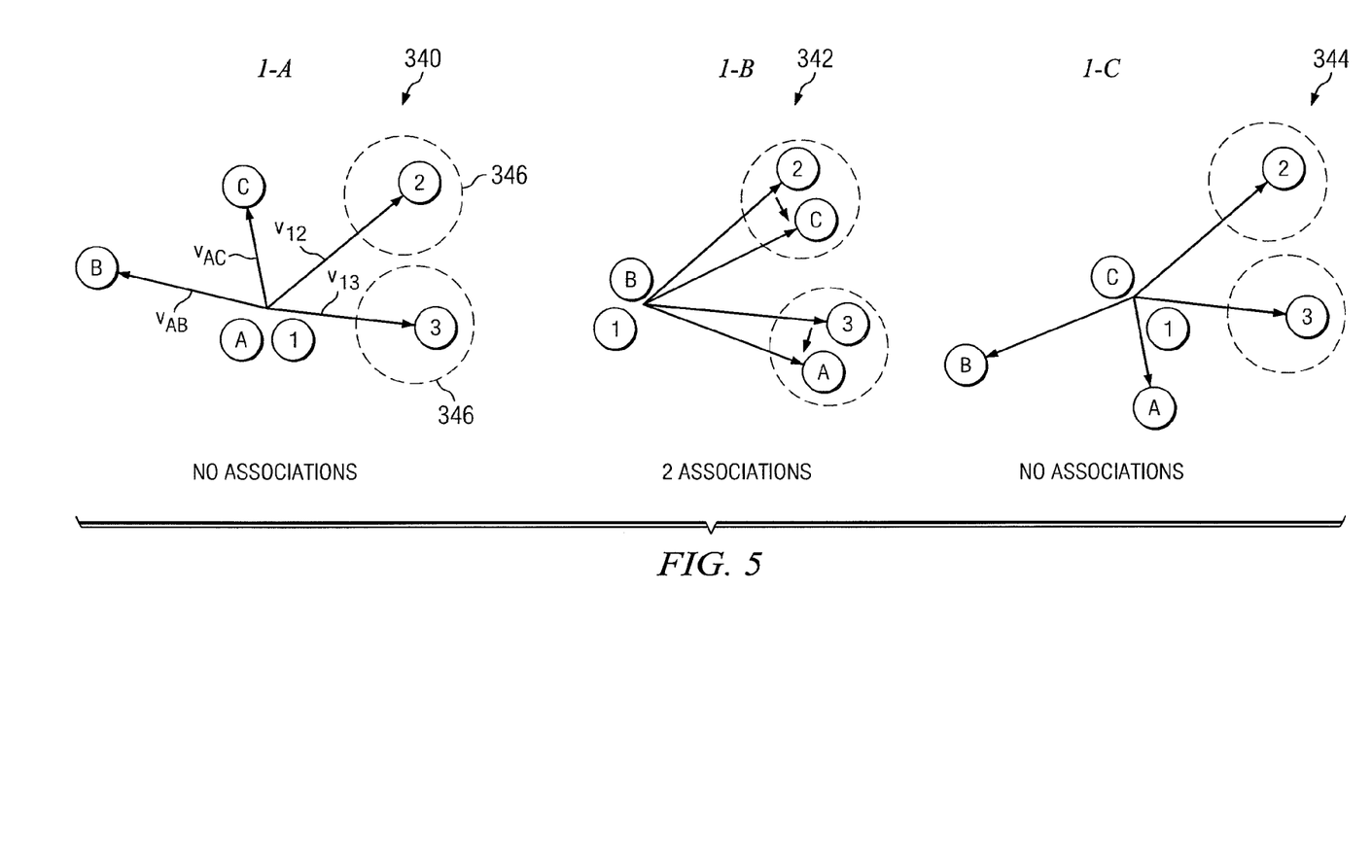
FIG. 5 illustrates examples of determining association scores for the delta vector sets.

FIG. 5 illustrates examples of determining association scores for the delta vector sets of FIG. 4. In certain embodiments, the origins of the delta vector sets are aligned, and then the delta vectors of the different delta vector sets are compared. If the delta vectors of one set are close to the delta vectors of the other set, an association score may indicate that the delta vector sets represent the same feature. If the delta vectors of one set are not close to the delta vectors of another set, an association score may indicate that the delta vector sets do not likely represent the same feature.

The closeness that designates whether vector sets likely represent the same feature may be indicated by error regions. The size of an error region may be determined in any suitable manner. For example, the error region may be determined by calculating an expected error due to sensors 124 that generated the data set.

In the illustrated example, association scores for delta pairs 1-A, 1-B, are 1-C are calculated. Graph 340 illustrates calculating an association score for delta pair 1-A, which are represented by delta vector sets $DV_{11}$ and $DV_{2A}$. The origin of the vector set for feature 1 is aligned with the origin for the delta vector set for feature A. Error regions 346 indicate a region about a delta vector of feature 1 in which a delta vector of feature A may fall if the delta vectors sets are likely to represent the same feature.

In particular embodiments, a vector from one vector set that falls within an error region of another vector from another vector set may be said to be associated with the other vector. In the illustrated example, no vectors from vector set $DV_2$ fall within the error regions 346 of vector set $DV_1$. That is, there are no associations.

In certain embodiments, an association score may be determined from a mathematical function of an associated vector error, the number of unassociated vectors, an unassociated vector cost, and/or other suitable factor. An associated vector error may be the error described by error region 346. The number of unassociated vectors may be the number of vectors for which no association is found. In the example for delta pair 1-A, there are four unassociated vectors. An unassociated vector cost represents the cost given to an unassociated vector. In particular embodiments, an association score may be given by:

Association score=associated vector error+number an associated vectors*unassociated vector cost.

An association score for delta pair 1-A may indicate that it is unlikely that delta vector sets $DV_{11}$ and $DV_{2A}$ represent the same feature. For example, if the association score is given by a cost, the cost may be a maximum value. For purposes of illustration, the cost for delta pair 1-A is given as 100.

Graph 342 illustrates calculating an association score for delta pair 1-B, which are represented by delta vector sets $DV_{11}$ and $DV_{2B}$. In the example, vector $v_{BC}$ falls within the error region 346 of vector $v_{12}$, and vector $v_{ba}$ falls within the error region 346 of vector $v_{13}$. Accordingly, there are two associations. The association score may indicate that it is likely that the vector sets represent the same feature. For purposes of illustration, the cost of delta pair 1-B is given as 1.

Graph 344 illustrates calculating an association score for delta pair 1-C, which are represented by delta vector sets $DV_{11}$ and $DV_{2C}$. In the example, there are no associations. The association score may indicate that it is not likely that the vector sets represent the same feature. For purposes of illustration, the cost for delta pair 1-C is given as 100.

The association scores may be placed in an association matrix. An example of an association matrix is shown below:

|   | A   | B   | C   |
|---|-----|-----|-----|
| 1 | 100 | 1   | 100 |
| 2 | 100 | 100 | 10  |
| 3 | 0.5 | 100 | 100 |

In the illustrated example, the first row shows the association scores from the comparisons of FIG. 5.

Referring back to FIG. 3, candidate vector pair combinations are determined at step 220. A candidate vector pair combination is a set of mappings of delta vector sets of one feature set to delta vector sets of another feature set. In certain embodiments, each vector set may be associated by a one-to-one matching to a vector set of the other feature set. Examples of candidate vector pair combinations include {1-A, 2-B, 3-C}, {1-C, 2-A, 3-C}, and {1-B, 2-C, 3-A}.

Candidate scores are determined for the candidate vector pair combinations to identify candidate pairs at step 224. A candidate score of a candidate vector pair combination indicates the likelihood that the combination correctly maps delta vector sets that represent the same physical feature. A candidate score of a candidate vector pair combination may be determined from the association scores of the vector pairs of the combination. In certain embodiments, a mathematical function may be applied to the association scores of the candidate vector pair combination to calculate the candidate score. In certain embodiments, a mathematical function may be applied to the assignment scores. For example, the assignment scores may be added together. In the example, the candidate vector pair combination {1-B, 2-C, 3-A} has scores 0.5, 1, and 10. The candidate score may be the sum of these assignment scores, 0.5+1+10=11.5.

The candidate vector pair combination with the optimal candidate score indicating that it most likely correctly maps delta vector sets that represent the same physical feature may be identified. The candidate pairs that most likely correctly map features for the given iteration may be taken from the identified candidate vector pair combination. In the example, the candidate vector pair combination {1-B, 2-C, 3-A} has the optimal candidate score, so the candidate pairs are 1-B, 2-C, and 3-A.

There may be a next iteration at step 226. The number of iterations to be performed may be determined in any suitable manner. As an example, iterations may be performed until a certain desired candidate score is reached. As another example, iterations may be performed until an allotted time is reached. As another example, iterations may be performed until a total number of iterations is reached. In some situations, less than 25, 25 to 50, or more than 50 iterations may be performed.

If a next iteration is to be performed, the method proceeds to step 230, where the delta vector sets are rotated. For example, delta vector sets $DV_1$ may be rotated with respect to the delta vector sets $DV_2$. The delta vector sets may be rotated in order to improve the alignment between the delta vector sets $DV_1$ and $DV_2$. Examples of rotation are described in more detail with reference to FIG. 6.

Figure 6:
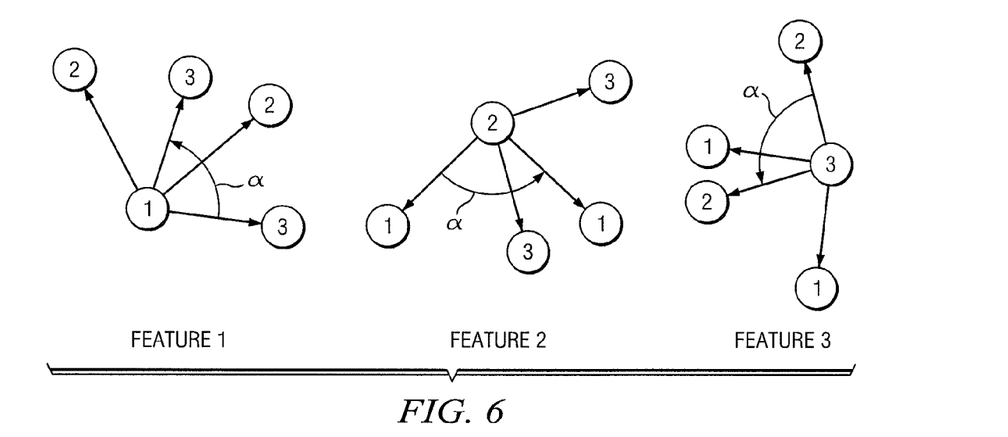
FIG. 6 illustrates an example of rotating delta vector sets.

FIG. 6 illustrates an example of rotating delta vector sets $DV_1$ with respect to the delta vector sets $DV_2$. Delta vector sets $DV_1$ may be rotated through any suitable rotation angle α. In certain embodiments, the rotation angle may be a predetermined increment, for example, less than 5 degrees, 5 to 10 degrees, or greater than 10 degrees. In certain embodiments, the increment of the rotation angle may change at each iteration. For example, the rotation angle may be larger at earlier iterations to determine a general range and smaller at later iterations to determine the specific angle that aligns the delta vector sets.

In certain embodiments, the rotation angle may be determined in response to candidate scores from a previous iteration. For example, if the candidate scores indicate a higher probability of matching with a rotation angle moving in a particular direction, then the rotation angle may continue in that direction. Otherwise, the rotation angle may go in the opposite direction.

Referring back to FIG. 3, if there is no next iteration, the method proceeds to step 234. Same feature delta pairs are determined according to the candidate scores at step 234. A same feature delta vector comprises a delta pair that represents the same physical feature. A candidate score that indicates the combination most likely to correctly map delta vector sets may be selected as the optimal candidate score. The vector pairs given by the candidate vector pair combination with the optimal candidate score may be selected as the same feature delta pairs. For example, if candidate vector pair combination {1-B, 2-C, 3-A} has the optimal candidate score, then 1-B, 2-C, and 3-A may be selected as the optimized vector pairs.

One or more features of the first sensor data set are assigned to one or more features of the second sensor data set according to the same feature delta pairs at step 242. In certain embodiments, an assignment vector may map a first feature to a second feature assigned to the first feature. Examples of assignment vectors are described in more detail with reference to FIG. 7.

Figure 7:
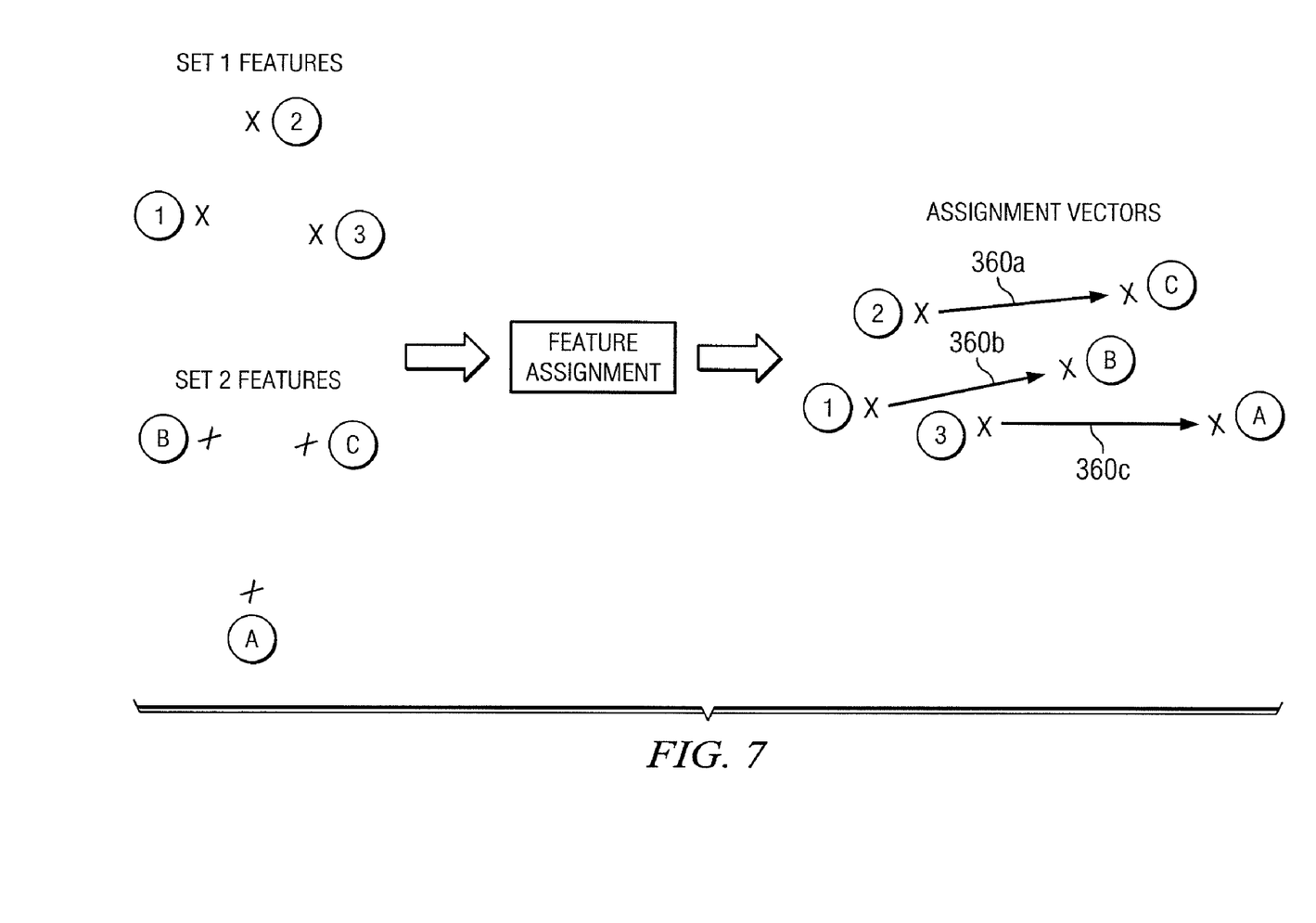
FIG. 7 illustrates examples of assignment vectors.

FIG. 7 illustrates examples of assignment vectors. Assignment vectors may indicate translations and/or rotations used to align features of one feature set with features of another feature set. In the example, assignment vector 360*a* maps feature 2 to feature C, assignment vector 360*b* maps feature 1 to feature B, and assignment vector 360*c* assigns feature 3 to feature A.

In certain embodiments, assignment vectors from a subset of the features may be used to determine assignment vectors for other features. For example, the average of assignment vectors of the subset of features may be used to determine the assignment vectors for the other features. As another example, the average assignment vector may be used to identify outlier assignment vectors. An outlier assignment vector may be an assignment vector that falls outside of one or two standard deviations of the average assignment vector. The outlier assignment vector may be removed an replaced with the average assignment vector.

Referring back to FIG. 3, features of the sensor data sets are fused at step 246. A first feature of the first sensor data set may be fused to a second feature of the second sensor data set that is assigned to the first feature. A layout of structures 120 may be generated from the fused features. The method then ends.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. As used in this document, "each" refers to each member of a set or each member of a subset of a set.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving a first sensor data set and a second sensor data set generated in response to sensing one or more structures, the sensor data sets describing a plurality of structural features of the structures;

generating a plurality of first delta vector sets for the first sensor data set and a plurality of second delta vector sets for the second sensor data set, each delta vector set comprising one or more delta vectors for a structural feature, a delta vector indicating one or more relative geometrical relationships between the structural feature and one or more other structural features of the each sensor data set; and determining a plurality of association scores for a plurality of delta pairs, a delta pair comprising a first delta vector set and a second delta vector set; and identifying a plurality of same feature delta pairs according to the association scores, a same feature delta vector set comprising a delta pair corresponding to the same structural feature.

2. The method of claim 1, further comprising:
assigning one or more first features of the first sensor data set to one or more second features of the second sensor data set according to the same feature delta pairs.

3. The method of claim 1, the determining the plurality of association scores further comprising performing the following for one or more iterations:
determining an association score for each delta pair; and
identifying a plurality of candidate pairs for an iteration according to the association scores, a candidate pair indicating a most likely mapping of a first feature to a second feature for the iteration.

4. The method of claim 1, the determining the plurality of association scores further comprising performing the following for one or more iterations:
identifying a plurality of candidate pairs for an iteration according to the association scores, a candidate pair indicating a mapping of a first feature to a second feature for the iteration; and
rotating the first delta vector sets with respect to the second delta vector sets.

5. The method of claim 1, the determining the plurality of association scores further comprising:
determining a plurality of candidate vector pair combinations, a candidate vector pair combination mapping one or more first features to one or more second features; and
determining a plurality of candidate scores for the candidate vector pair combinations, a candidate score for a pair indicating a likelihood that the candidate vector pair combination correctly maps the first features to the second features.

6. The method of claim 1:
the determining the plurality of association scores further comprising:
determining a plurality of candidate scores for a plurality of candidate vector pair combinations from the association scores, a candidate score indicating a likelihood that a candidate vector pair combination correctly maps the first features to the second features; and
the identifying the plurality of same feature delta pairs further comprising:
identifying the same feature delta pairs according to the candidate scores.

7. The method of claim 1, the determining the plurality of association scores further comprising performing the following for one or more iterations:
determining an association score for each delta pair;
identifying a plurality of candidate delta pairs according to the association scores; and
applying a function to the association scores of the candidate delta pairs to calculate a candidate score.

8. The method of claim 1, each sensor data set indicating a location of each feature of the each sensor data set.

9. The method of claim 1, further comprising:
assigning one or more first features of the first sensor data set to one or more second features of the second sensor data set according to the same feature delta pairs;
fusing the features of the first sensor data set assigned to the features of the second sensor data set; and
generating a layout of the one or more structures from the fused features.

10. An apparatus comprising:
a memory configured to store a first sensor data set and a second sensor data set generated in response to sensing one or more structures, the sensor data sets describing a plurality of structural features of the structures;
one or more processors coupled to the memory and configured to:
generate a plurality of first delta vector sets for the first sensor data set and a plurality of second delta vector sets for the second sensor data set, each delta vector set comprising one or more delta vectors for a structural feature, a delta vector indicating one or more relative geometrical relationships between the structural feature and one or more other structural features of the each sensor data set;
determine a plurality of association scores for a plurality of delta pairs, a delta pair comprising a first delta vector set and a second delta vector set;
identify a plurality of same feature delta pairs according to the association scores, a same feature delta vector set comprising a delta pair corresponding to the same structural feature; and
assign one or more first features of the first sensor data set to one or more second features of the second sensor data set according to the same feature delta pairs.

11. The apparatus of claim 10, the processors configured to:
assign one or more first features of the first sensor data set to one or more second features of the second sensor data set according to the same feature delta pairs.

12. The apparatus of claim 10, the processors configured to determine the plurality of association scores by performing the following for one or more iterations:
determining an association score for each delta pair; and
identifying a plurality of candidate pairs for an iteration according to the association scores, a candidate pair indicating a most likely mapping of a first feature to a second feature for the iteration.

13. The apparatus of claim 10, the processors configured to determine the plurality of association scores by performing the following for one or more iterations:
identifying a plurality of candidate pairs for an iteration according to the association scores, a candidate pair indicating a mapping of a first feature to a second feature for the iteration; and
rotating the first delta vector sets with respect to the second delta vector sets.

14. The apparatus of claim 10, the processors configured to determine the plurality of association scores by:
determining a plurality of candidate vector pair combinations, a candidate vector pair combination mapping one or more first features to one or more second features; and
determining a plurality of candidate scores for the candidate vector pair combinations, a candidate score for a pair indicating a likelihood that the candidate vector pair combination correctly maps the first features to the second features.

15. The apparatus of claim 10, the processors configured to:
   determine the plurality of association scores by:
      determining a plurality of candidate scores for a plurality of candidate vector pair combinations from the association scores, a candidate score indicating a likelihood that a candidate vector pair combination correctly maps the first features to the second features; and
   identify the plurality of same feature delta pairs by:
      identifying the same feature delta pairs according to the candidate scores.

16. The apparatus of claim 10, the processors configured to determine the plurality of association scores by performing the following for one or more iterations:
   determining an association score for each delta pair;
   identifying a plurality of candidate delta pairs according to the association scores; and
   applying a function to the association scores of the candidate delta pairs to calculate a candidate score.

17. The apparatus of claim 10, each sensor data set indicating a location of each feature of the each sensor data set.

18. The apparatus of claim 10, the processors configured to:
   assign one or more first features of the first sensor data set to one or more second features of the second sensor data set according to the same feature delta pairs;
   fuse the features of the first sensor data set assigned to the features of the second sensor data set; and
   generate a layout of the one or more structures from the fused features.

19. One or more computer readable storage media storing logic executable by a processor, the logic configured to:
   store a first sensor data set and a second sensor data set generated in response to sensing one or more structures, the sensor data sets describing a plurality of structural features of the structures;
   generate a plurality of first delta vector sets for the first sensor data set and a plurality of second delta vector sets for the second sensor data set, each delta vector set comprising one or more delta vectors for a structural feature, a delta vector indicating one or more relative geometrical relationships between the structural feature and one or more other structural features of the each sensor data set;
   determine a plurality of association scores for a plurality of delta pairs, a delta pair comprising a first delta vector set and a second delta vector set;
   identify a plurality of same feature delta pairs according to the association scores, a same feature delta vector set comprising a delta pair corresponding to the same structural feature; and
   assign one or more first features of the first sensor data set to one or more second features of the second sensor data set according to the same feature delta pairs.

20. The media of claim 19, the logic configured to:
   assign one or more first features of the first sensor data set to one or more second features of the second sensor data set according to the same feature delta pairs.

* * * * *